(12) United States Patent
Burkhardt

(10) Patent No.: US 6,208,285 B1
(45) Date of Patent: Mar. 27, 2001

(54) PULSE COMPRESSOR FOR DOPPLER TOLERANT RADAR

(75) Inventor: Phillip E. Burkhardt, Melville, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 06/465,657

(22) Filed: Feb. 10, 1983

(51) Int. Cl.[7] .................................................... G01S 13/38
(52) U.S. Cl. ...................... 342/132; 342/160; 342/195; 342/202
(58) Field of Search .............................. 343/7.7, 17.2 PC, 343/5 DP; 364/724, 724.011, 724.06, 724.08; 342/132, 160, 195, 196, 202

(56) References Cited

U.S. PATENT DOCUMENTS

| | | | |
|---|---|---|---|
| 4,313,170 | * | 1/1982 | Lewis et al. ................... 343/17.2 PL |
| 4,375,640 | * | 3/1983 | Harvey . | |
| 4,379,295 | * | 4/1983 | Lewis et al. ................... 343/17.2 PL |
| 4,404,562 | * | 9/1983 | Kretschmer, Jr. et al. ...... 342/132 X |
| 4,591,857 | * | 5/1986 | Thor ...................................... 342/201 |
| 4,760,398 | * | 7/1988 | Norsworthy ......................... 342/114 |
| 5,347,281 | * | 9/1994 | Lewis et al. ......................... 342/160 |

FOREIGN PATENT DOCUMENTS

296061A * 2/1975 (SU) .

OTHER PUBLICATIONS

Lewis et al, "Linear Frequency Modulation Derived Polyphase Pulso–Compression Codes and an Efficient Digital Implementation", NRL Report 8541, Nov. 2, 1981, Naval Research Laboratory, Wash. D.C.*

Haykin et al "Adaptive Digital Filtering for Coherent MTI Radar" Information Sciences vol. 11, No. 4, pp. 335–359, 1976.*

* cited by examiner

Primary Examiner—John B. Sotomayor
(74) Attorney, Agent, or Firm—Terry J. Anderson; Karl J. Hoch, Jr.

(57) ABSTRACT

A radar system employing Doppler tolerant radar pulses such as linear FM or hyperbolic FM chirps includes a pulse compressor configured as a digital finite impulse response filter. In one embodiment, the radar returns are split into in-phase and quadrature phase components for manipulation in complex form within the filter.

5 Claims, 3 Drawing Sheets

PULSE COMPRESSOR FOR DOPPLER TOLERANT RADAR

BACKGROUND OF THE INVENTION

This invention relates to a particular class of radar systems, more specifically radars for detecting high velocity airborne targets by "Doppler tolerant" types of radar pulse modulation. More particularly, the invention relates to radar pulse compression of the target returns of such radars by digital finite impulse digital filters whose coefficients are the conjugates of the corresponding of the "Doppler tolerant" modulation algorithm of the radar pulse.

Early radar systems employed narrow transmitter pulses to provide fine range resolution of target returns. Such primitive systems required extremely high peak power to achieve long range detection. In addition, narrow transmitter pulses perform very poorly with regard to surface and weather clutter.

To alleviate these problems, pulse compression techniques have been incorporated in radar systems. In general, such techniques involve the use of radar pulses of long duration but limited peak power. Prior to transmission, the long pulse is modulated by a predetermined amplitude, phase or frequency varying function, and the energy of the resulting return pulse is compressed into a narrow pulse of fine range resolution by a corresponding correlation function. Thus, long range detection is facilitated by the long pulse duration, Since the introduction of pulse compression techniques to radar systems, improvements in radar capabilities have largely focused on the development of sophisticated pulse modulation functions. One particular problem which has been addressed by such functions is the detection of high speed aircraft which have increased in number both in military and civilian applications. Studies undertaken in the mid-1970's have indicated that broad Doppler spectrum tolerance—i.e., the ability to compress and detect returns from multi-Mach airborne targets—is exhibited by long pulses of linearly varying frequency. More recently, promising results have been obtained using another family of modulating functions which produce pulses of hyperbolically varying frequency.

It is especially desirable, in detecting and tracking high speed aircraft, to process the reflected radar pulses immediately. The use of long, Doppler tolerant pulses, however, exacerbates the problem of real time pulse compression, requiring a substantial amount of hardware to realize the necessary processing throughput which may, in some instances, require billions of arithmetic operations per second. A review of present available techniques for Doppler tolerant pulse-compression indicates that each exhibits one or more important drawbacks.

With regard to wholly analog techniques, dispersive delay lines for processing of long pulses—up to one 20 millisecond in duration—are massive and therefore impractical for most applications. Saw devices, representing another analog approach, are limited to pulse widths of less than 50 or 60 microseconds.

Compression of linear or hyperbolic frequency modulated (LFM, HFM) radar return pulses has heretofore centered on the use of discrete analog devices commonly known as charge coupled devices (CCD's) or charge transfer devices (CTD's). Radar return samples are sequentially stored in analog form in each of a plurality of capacitive elements making up the CCD. To achieve the same result in a completely digital manner, with similar return sample amplitude resolution each CCD register would have to be replaced by several digital shift registers, one for each required bit of sample amplitude resolution. CCD registers accommodating as many as 512 data points have been implemented for compressing linear frequency modulated (LFM) pulses with bandwidths in excess of 1.25 megahertz.

While present CCD filters have provided a workable solution to the LFM pulse compression problem, several problems remain. In particular, CCD's are bandwidth limited and exhibit poor dynamic range (55 dB), making full realization of the theoretical benefit of LFM radar difficult in practice.

Improvements in digital hardware have stimulated interest in wholly digital radar pulse compression techniques. Some of the earlier developments of such techniques relied on specially encoded pulses designed for efficient recognition. These techniques have proven unsatisfactory with respect to Doppler tolerance due to the discrete phase and frequency jumps inherent in the digitally encoded pulses.

U.S. Pat. No. 4,006,351, issued to Constant suggests that frequency domain signal analysis techniques may be applied to digital radar processing. As indicated, Discrete Fourier Transform (DFT) and Fast Fourier Transform (FFT) filters may be employed as clutter filters in radar systems, but the implementation of a frequency domain filter for long LFM and HFM pulses would require a substantial number of currently available digital hardware elements.

Another general type of digital filter operates in the time domain, thus avoiding the necessity of Fourier and inverse Fourier analysis. Such filters have found application in audio and data transmission systems, as exemplified by U.S. Pat. No. 3,912,917, issued to Nussbaumer, and for radar clutter cancellation, as disclosed in an article by S. Haykin and C. Hawkes entitled "Adaptive Digital Filtering for Coherent MTI Radar," Information Sciences, Vol. 11, No. 4, 1976, pages 335 to 359. Again, however, because of the high frequencies and corresponding high sample rates associated with radar signals, digital time domain filters have not been suggested for the more computationally intensive task of real time compression of linear or hyperbolic FM radar pulses.

SUMMARY OF THE INVENTION

It is a principal object of this invention to provide a radar pulse compression filter adaptable for use with highly Doppler tolerant radars.

Another object is to provide such a filter which may be implemented with presently available digital hardware.

In keeping with the above objects, it has been found that LFM and HFM radar returns may be processed in real time to high pulse compression ratios and high bandwidths by means of a non-recursive, finite impulse response digital filter. That is, by appropriately combining available very large scale integrated (VLSI) circuit elements into filter networks capable of handling hundreds or thousands of data points at up to 20 megahertz bandwidths with multi-bit input data samples, the desired pulse width and amplitude resolution for a long pulse, Doppler tolerant radar system may be accommodated on a wholly digital level.

In a preferred embodiment of the present invention, the radar returns are split into real and imaginary parts, the real part being an in-phase version of the reflected signal and the imaginary part a quadrature phase version. The real and imaginary returns are sampled and shifted into separate registers. Real and imaginary weighted coefficient registers are loaded, respectively, with corresponding in-phase and quadrature phase samples of the desired characteristic radar pulse. Each coefficient register position has an associated pair of digital multipliers, each multiplier in turn corresponding to a specific position in either the real or the imaginary input data register. The real and imaginary product terms are summed separately to produce the desired complex compressed pulse.

A still further advantage of the present invention is improved dynamic range and bandwidth over present CCD filters. The relative ease with which the characteristic demodulating function may be changed offers a further advantage over CCD filters which require development of a new device for any change in coefficients. Also, the necessary hardware is often less than would be required to implement a real time pulse compression network using FFT's.

BRIEF DESCRIPTION OF THE DRAWINGS

A better understanding of the present invention may be had with reference to the appended drawings, in which.

DETAILED DESCRIPTION OF PREFERRED EMBODIMENTS

Figure 1:
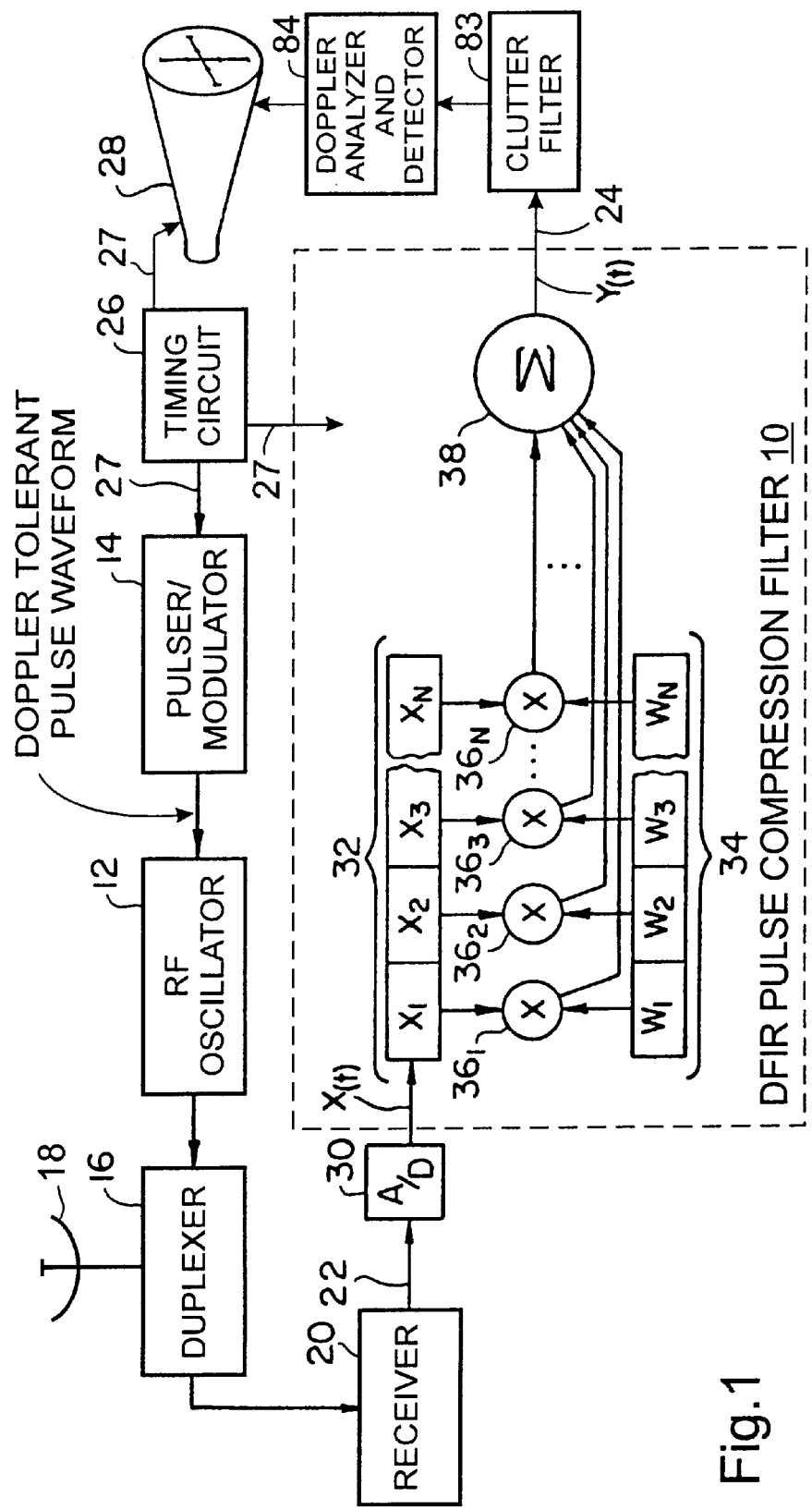
FIG. 1 is a block diagram of a radar system showing in detail a pulse compressor embodying the present invention.

Referring to FIG. 1, a block diagram of a radar system incorporating a pulse compressor circuit 10 embodying the present invention is shown. As will be appreciated by those skilled in the art, the radar transmitting system includes a radio frequency oscillator 12 controlled by a Doppler tolerant pulser/modulator 14. The energy of oscillator 12 is passed through a duplexer 16 to antenna 18.

Reflections of the transmitted radar pulses from extraneous objects to be detected are sensed by radar receiver 20, which may be an ordinary heterodyne type radio receiver having a high sensitivity in the bandwidth corresponding to the frequency of oscillator 12. As is typical in radar systems, antenna 18 is used both for transmitting and receiving. Thus, duplexer 16 cuts off receiver 20 during intervals when oscillator 12 is sending out pulses, and disconnects the transmitter during the periods between these pulses when the echos are being received.

The radar returns sensed by receiver 20 are passed, in turn, to pulse compressor 10, as indicated by receiver output 22. The demodulated or compressed pulses are output at 24 to a clutter filter 83, a Doppler analyzer and detector 84 and an oscilloscope display 28. A timing circuit 26 synchronizes, at 27, the pulser/modulator, pulse compressor and displays, and may, typically, include a sweep voltage generator for the oscilloscope display 28, which may be a range indicator of the A presentation type, plan position indicator type, or any other standard radar display.

As shown in FIG. 1, pulse compressor 10 includes an analog-to-digital (A/D) converter 30 responsive to receiver output 22, a shift register 32 responsive to converter 30, a weighted coefficient register 34, a plurality of digital multipliers $36_1, 36_2, \ldots 36_N$ in one-to-one correspondence with the bit positions of shift register 32 and weighting register 34, and a digital summer 38. The output $Y_{(t)}$ from summer 38, then, will be the sum of N product terms.

It will be appreciated that the output $x_{(t)}$ from converter 30 will typically be a multi-bit logical signal, made up of a number of parallel logic signals, depending on the desired amplitude resolution. Thus, in practice, shift register 32 represents a number of identical registers corresponding to the number of output bits from converter 30. Similarly, register 34 represents a number of identical registers corresponding to the desired resolution of the weighted coefficients. Each multiplier input, in turn, consists of a parallel combination of one logical signal from the associated bit position of each input shift register 32 or weighting register 34.

Figure 2:
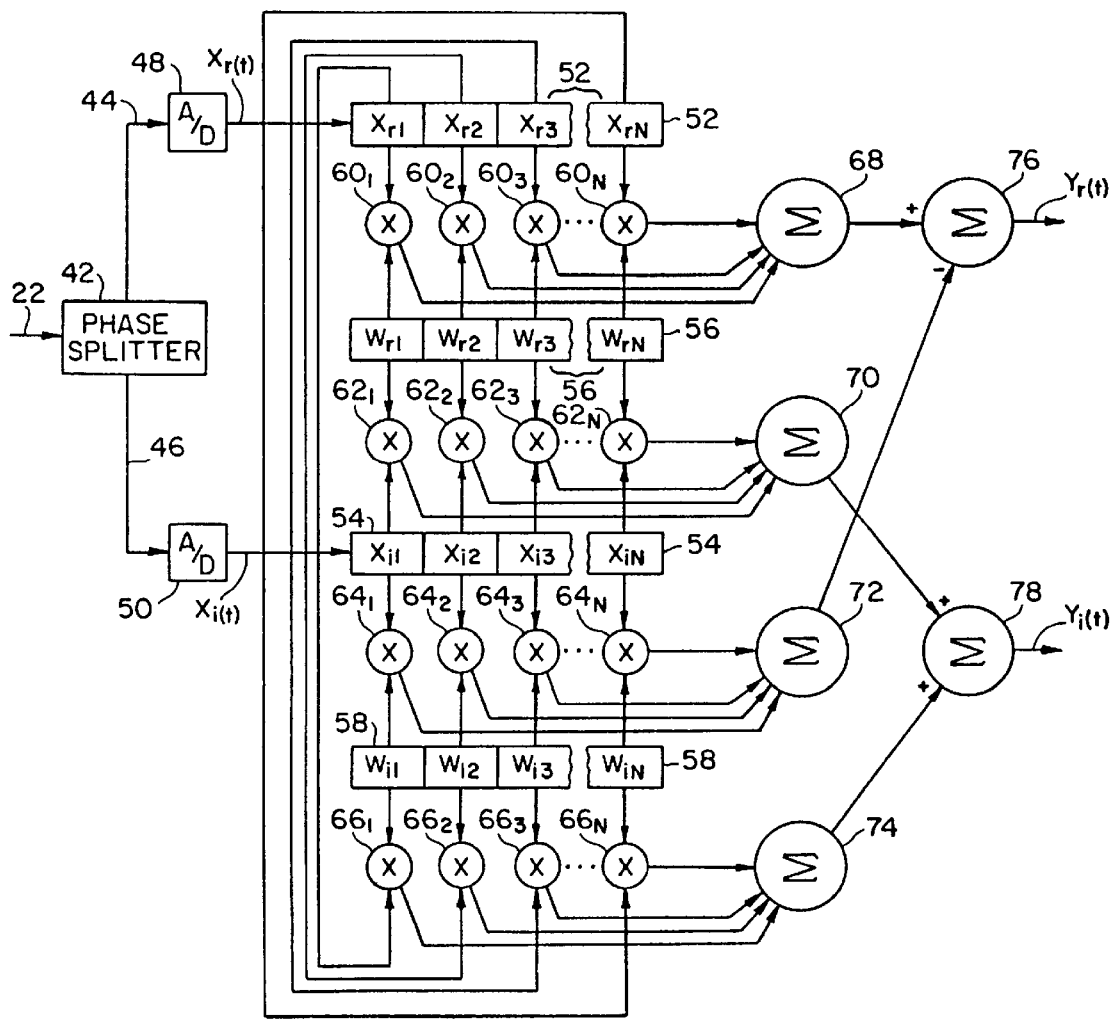
FIG. 2 is a detailed diagram of another pulse compressor embodying the present invention.

FIG. 2 illustrates another embodiment of the pulse compressor of the present invention utilizing a complex, two-component representation of the radar return signal. As shown, the receiver output 22 is applied to a phase splitter 42 which outputs a real return signal 44 and an imaginary return signal 46. In practice, receiver 20 and phase splitter 42 may be implemented together by heterodyning the still modulated radar returns (from duplexer 16) with two separate reference signals derived from the unmodulated output of oscillator 12, the references being 90° out of phase with respect to one another. Thus real return signal 44 represents an in-phase version of the demodulated return 22, while the imaginary signal 46 is a quadrature phase version of the real signal. A real A/D converter 48 is responsive to 44, and signal 46 is passed to imaginary A/D converter 50.

The digitized real and imaginary return samples are shifted into real and imaginary shift registers 52 and 54 respectively. Paralleling the input shift registers 52 and 54 are real and imaginary weighted coefficient registers 56 and 58. In practice, as discussed above with reference to registers 32 and 34 in FIG. 1, registers 52, 54, 56, and 58 are each implemented as a number of registers corresponding to the number of output bits from converters 48 or 50 or the desired resolution of the weighted coefficients.

It will be appreciated that four sets of digital multipliers are necessary to implement the complex pulse compressor. As shown in FIG. 2, these multipliers are identified as first real term multipliers $60_1, 60_2, \ldots,$ and $60_N$ responsive to real shift register 52 and real weighting register 56; first imaginary term multipliers $62_1, 62_2, \ldots,$ and $62_N$ responsive to real weighting register 56 and imaginary shift register 54; second real term multipliers $64_1, 64_2, \ldots,$ and $64_N$ responsive to imaginary shift register 54 and imaginary weighting register 58; and second imaginary term multipliers $66_1, 66_2, \ldots,$ and $66_N$ responsive to real shift register 52 and imaginary weighting register 58.

Each set of multipliers has an associated digital summer. Thus, first real term summer 68 is responsive to the first real term multipliers 60, first imaginary term summer 70 to the first imaginary term multipliers 62, second real term summer 72 to the second real term multipliers 64, and second imaginary term summer 74 to the second imaginary term multipliers 66. Finally, two digital output summers 76 and 78 are used to derive, respectively, the real and imaginary parts of the compressed pulse for use by the timing circuit. As shown, real output summer 76 is responsive to real term summers 68 and 72, and imaginary output summer 78 is responsive to imaginary term summers 70 and 74. It will be noted that the input from the second real term summer 72 is inverted by real output summer 76 to correct the sign in accordance with the identity:

$$+\Sigma(\text{imaginary} \times \text{imaginary}) + \Sigma(\text{real} \times \text{real}).$$

Each data point or radar return sample stored in the input shift register represents the instantaneous value (most recently-acquired sample) of the uncompressed radar return signal at one of a series of evenly spaced sample times. In FIG. 1, the uncompressed signal at time t is indicated as $x_{(t)}$, while in FIG. 2, the real and imaginary signals are shown as $x_{r(t)}$ and $x_{i(t)}$ respectively. Thus, the stored or delayed samples in each input shift register may be identified by reference to the sample time, t, and the sample period, s. In register 32 (FIG. 1), then, positions or stages $X_1, X_2, \ldots, X_n$ and $X_N$ contain samples $x_{(t-s)}, x_{(t-2s)}, \ldots, x_{(t-ns)}, \ldots,$ and $x_{(t-Ns)}$. Register 52 (FIG. 2) stages $X_{r1}, X_{r2}, \ldots, X_{rn}, \ldots$ and $X_{rN}$ contain $x_{r(t-s)}, x_{r(t-2s)}, \ldots, x_{r(t-ns)}, \ldots,$ and $x_{r(t-Ns)}$; and register 54 stages $X_{i1}, X_{i2}, X_{in}, \ldots,$ and $X_{iN}$ contain $x_{i(t-s)}, x_{i(t-2s)}, \ldots, x_{i(t-ns)}, \ldots,$ and $x_{i(t-Ns)}$. It is readily seen that the output from a particular multiplier $36_n, 60_n, 62_n, 64_n$, or $66_n$, respectively, is given by $W_n \cdot x_{(t-ns)}, W_{rn} \cdot x_{r(t-ns)}, W_{rn} \cdot x_{i(t-ns)}, W_{in} \cdot x_{i(t-ns)},$ or $W_{in} \cdot x_{r(t-ns)}$. The compressed pulse output 24 from summer 38, then, is given by:

$$Y_{(t)} = \sum_{n=1}^{N} W_n \cdot x_{(t-ns)} \quad (1)$$

Similarly, the output from the pulse compressor of FIG. 2 may be represented in complex form as:

$$Y_{(t)} = \sum_{n=1}^{N} [W_{rn} \cdot x_{r(t-ns)} - W_{in} \cdot x_{i(t-ns)}] + j \sum_{n=1}^{N} [W_{rn} \cdot x_{i(t-ns)} + W_{in} \cdot x_{r(t-ns)}] \quad (2)$$

where the first summation represents the output of real summer 76, and the second summation, having the imaginary factor j, is the output from summer 78.

It will be appreciated that the compressed pulse summations described above are analogous to the convolutions performed by finite impulse response (FIR) or transverse digital filters presently used in audio and data communications, as well as other radar applications. The shifting of return samples into the input registers creates the effect of a sliding window by the weighting register. Thus, the weighting coefficients stored in the weighting registers may be defined by sampling a modulating pulse from pulser/modulator 14. The sample rate used to define the weighting coefficients must, of course, be identical to the rate at which the radar return signals are sampled by each A/D converter.

It will be further realized that the number of data points implemented in a radar pulse compressor embodying the present invention is a direct measure of the pulse compression ratio achieved thereby. In turn, the number of data points, equal to N in FIGS. 1 and 2 and equations (1) and (2) above, will be predicated on a number of factors, including the bandwidth and duration of the characteristic pulses to be accommodated in a particular system.

Figure 3:
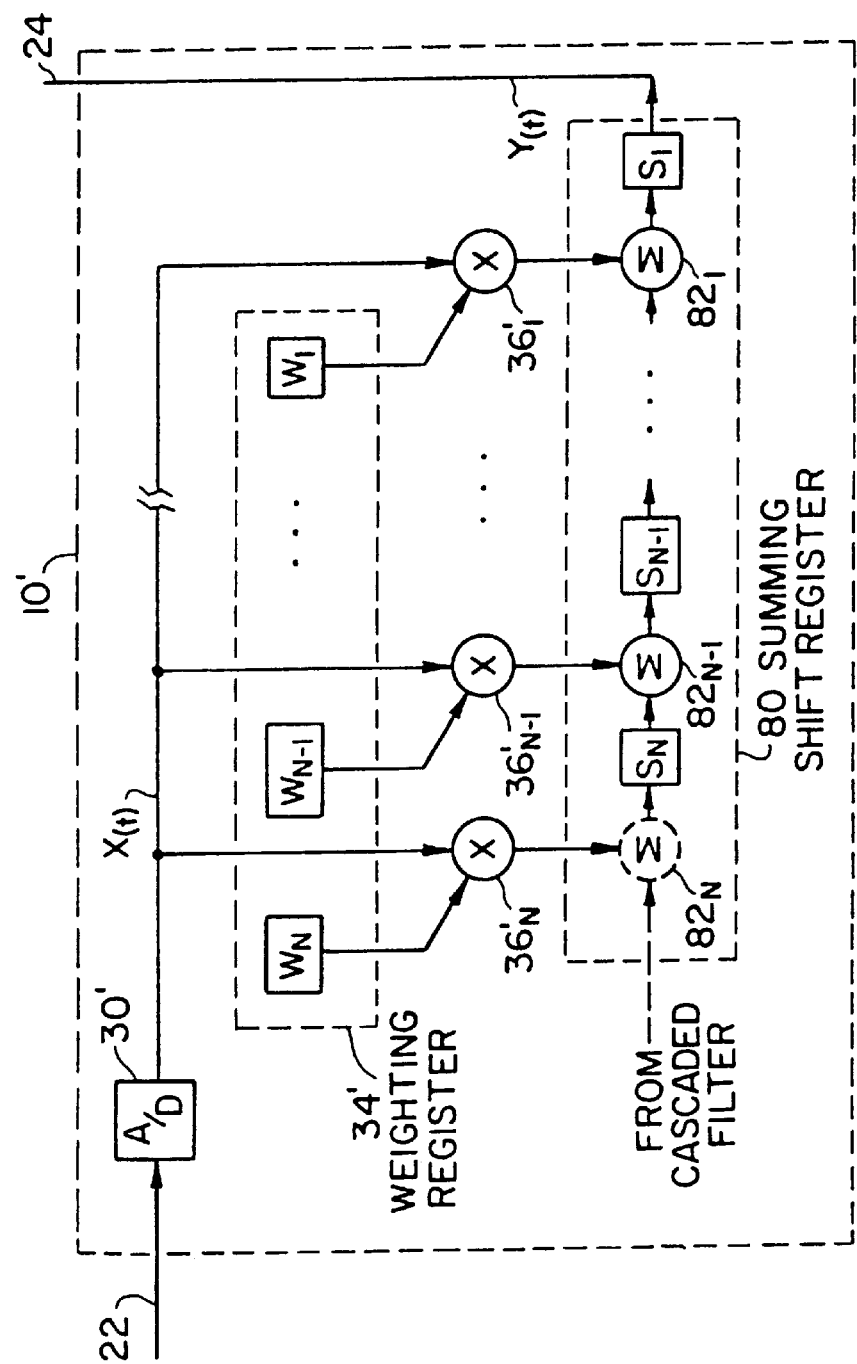
FIG. 3 is a detailed diagram of still another pulse compressor embodying the present invention.

FIGS. 1 and 2 represent the canonical form of digital FIR filter applied to radar pulse compression. Other architectures are known, however, which provide the identical outputs represented by equations (1) and (2) without using multi-input summers. FIG. 3 shows an example of such an architecture.

As shown, pulse compressor 10' of FIG. 3 includes several elements directly analogous to those of pulse compressor 10 in FIG. 1. Specifically, A/D converter 30' outputs the new return sample $x_{(t)}$ during each sample period, and weighting register 34' includes storage positions for the reverse order weighted coefficients $W_N, W_{N-1}, \ldots,$ and $W_1$ which provide inputs to multipliers $36'_N, 36'_{N-1}, \ldots, 36'_1$. The input shift register and output summer, however, are replaced by a summing shift register 80, in which the contents of each storage position $S_N, S_{N-1}, \ldots,$ and $S_i$ are summed by means of two-input summers $82_{N-1}, 82_{N-2}, \ldots,$ and $82_1$ with the outputs from multipliers $36'_N, 36'_{N-1}, \ldots, 36'_1$ before being shifted to the next position. In turn, the second input for each multiplier is taken directly from the currently sampled return input, $x_{(t)}$. Thus, all of the products for the most recent return sample are computed simultaneously, and the appropriate FIR filter summation is accumulated in separate summer and delay stages or storage positions in register 80 at each multiplier output.

It will be readily appreciated that the identical modification of filter 10 may be made on the complex filter of FIG. 2. One or two summing shift registers for each output component, $Y_{r(t)}$ and $Y_{i(t)}$, could be used. If one register is used, each summer would have three inputs—one from each associated real or imaginary term multiplier. If two real and two imaginary summing shift registers are employed, their last stage outputs would be combined by two additional two-input summers analagous to output summers 76 and 78 in FIG. 2.

Another variation indicated in FIG. 3 is the optional use of summer $82_N$ (dashed lines). Since, as shown, there is no previous storage position to $S_N$, the output from multiplier $36'_N$ could be applied directly thereto. Incorporation of a superfluous summer allows direct cascading of shorter filters to form longer ones.

As indicated above, digital FIR filters are presently used in low frequency applications such as audio processing, and are readily implemented by interconnecting available small scale integrated circuit chips such as standard shift registers, multipliers and adder chips. Long, high resolution FIR filters suitable for Doppler tolerant radar pulse compression could be constructed from such small scale elements; however, with the advent of very large scale integrated circuitry it is possible to combine many shift register stages, multipliers, adders, etc. on a single chip.

A suitable device for the construction of radar pulse compressors embodying this invention is the DF-8 FIR filter, presently under development by TRW. The DF-8 is an eight point FIR filter on a single 48-pin chip which accommodates four-bit input data and weighting coefficients. Partial sum input and output ports of 13 bits permit serial cascading of up to four chips without external adders to form a 32-point filter, with four-bit input and weighting coefficients, operable at a 20 MHz data rate. In turn, provision for higher bandwidths and greater resolution may be made by appropriately combining such short filters into large networks using additional external summers and delay units.

For instance, a single 32-point, 8-input bit filter may be formed by inputting four least significant bits of sampled data to a first 32-point, 4-input bit filter and four most significant bits of data to a second similar filter. Four least significant compressed pulse output bits would then be taken directly from the four least significant output bits of the first filter, while the remaining compressed pulse bits would be derived by an external adder combining the entire output of the second filter with the remaining output bits from the first filter.

While the foregoing descriptions represent several preferred embodiments of the present invention, it will be appreciated that various modifications may be made to satisfy the requirements of a particular application.

For instance, a pipelined architecture may be used to process long pulses at a high data rate. Such an arrangement would include an output accumulator (range bin) array and a number of short filters each having its weighting register loaded with a different set of weighting coefficients corresponding to a predetermined segment of the modulating pulse. As the input samples are shifted in parallel through the short filters, then, each output would be accumulated in the appropriate range bin.

Segmenting of the modulating pulse and a range bin array may also be used in a sequentially operating network at a slower throughput rate but using much less filter hardware. Sequential processing of a long pulse by a short filter would be accomplished by loading the weighting coefficients for the first segment and shifting the return samples (from an input buffer) through while accumulating each output in the appropriate range bin, then repeating the same steps for each segment of the modulating pulse.

In view of these and various other modifications of the above disclosed preferred embodiments which will suggest themselves to those of skill in the art, the scope of the-present invention is to be measured only by the claims which follow.

What is claimed is:

1. A digital finite impulse response filter for pulse compressing radar returns for radar systems having means for generating a radar transmission signal having broad Doppler tolerant pulses such as linear frequency modulated pulses and frequency modulated pulses, said filter comprising weighting means for storing a plurality of weighting coefficients defined by sampling said radar signal at a desired sample rate, said weighting means including real weighting means for storing a plurality of real coefficients defined by sampling said radar signal at a desired sample rate, and imaginary weighting means for storing a plurality of imaginary coefficients defined by sampling a quadrature phase version of said radar signal at the desired sample rate;

shift register means for sequentially introducing digitized return samples of the radar returns into each of a plurality of storage positions within said shift register means, each such storage position being associated with one of the weighting coefficients;

a plurality of digital multipliers in one-to-one correspondence with the shift register means storage positions, each of said multipliers being arranged to output a product of the return sample currently stored in the corresponding storage position multiplied by the associated weighting coefficient, whereby each of said digital multipliers corresponds with a corresponding one of the weighting coefficients, each of said multipliers being arranged to output a product of a corresponding weighting coefficient multiplied by a most recent digitized return sample of the radar return; and summing means responsive to said multipliers for outputting a sum of all the multiplier products, said summing means including summing shift register means having a plurality of storage positions in one-to-one correspondence with the digital multipliers and a plurality of two-input digital summers arranged such that a number stored in each summing shift register means storage position is summed with the output of said digital multiplier associated with an adjacent summing shift register means storage position before being shifted to said adjacent storage position, said weighting means, shift register means, multipliers and summing means being of sufficient resolution to permit arbitrary use of any pulse length, bandwidth and modulation combination.

2. A filter as claimed in claim 1, comprising phase splitting means responsive to the radar returns for outputting real and imaginary return signals, the imaginary return signal being a quadrature phase version of the real return signal;

real shift register means for sequentially introducing digitized real return samples of the radar returns into each of a plurality of storage positions within said real shift register means, each such storage position in said real shift register means being associated with one of the real coefficients and one of the imaginary coefficients;

imaginary shift register means for sequentially introducing digitized imaginary return samples of the radar returns into each of a plurality of storage positions within said imaginary shift register means, each such storage position in said imaginary shift register means being associated with one of the real coefficients and one of the imaginary coefficients, the number of storage positions in said imaginary shift register means being equal to the number of storage positions in said real shift register means;

a first plurality of real term digital multipliers in one-to-one correspondence with the real and imaginary shift register means storage positions, each of said first real term multipliers being arranged to output a product of the real return sample currently stored in the corresponding storage position multiplied by the associated real coefficient;

a first plurality of imaginary term digital multipliers in one-to-one correspondence with said real and imaginary shift register means storage positions, each of said first imaginary term multipliers being arranged to output a product of the real return sample currently stored in the corresponding storage position multiplied by the associated imaginary coefficient;

a second plurality of imaginary term digital multipliers in one-to-one correspondence with said real and imaginary shift register means storage positions, each of said second imaginary term multipliers being arranged to output a product of the imaginary return sample currently stored in the corresponding storage position multiplied by the associated real coefficient;

a second plurality of real term digital multipliers in one-to-one correspondence with said real and imaginary shift register means storage positions, each of said second real term multipliers being arranged to output a negated product of the imaginary return sample currently stored in the corresponding storage position multiplied by the associated imaginary coefficient;

real summing means responsive to said first and second pluralities of real term multipliers for outputting a sum of all the products of said first plurality of real term multipliers and the negated products of said plurality of second real term multipliers; and imaginary summing means responsive to said first and second pluralities of imaginary term multipliers for outputting a sum of all the products of said imaginary term multipliers.

3. A filter as claimed in claim 1, comprising phase splitting means responsive to the radar returns for outputting real and imaginary return signals, the imaginary return signal being a quadrature phase version of the real return signal;

a first plurality of real term digital multipliers in one-to-one correspondence with the real and imaginary coefficients, each of said first real term multipliers being arranged to output a product of a corresponding real coefficient multiplied by a most recent real return sample;

a first plurality of imaginary term digital multipliers in one-to-one correspondence with said real and imaginary coefficients, each of said first imaginary term multipliers being arranged to output a product of a corresponding imaginary coefficient multiplied by the most recent real return sample;

a second plurality of imaginary term digital multipliers in one-to-one correspondence with said real and imaginary coefficients, each of said second imaginary term multipliers being arranged to output a product of a corresponding real coefficient multiplied by a most recent imaginary return sample;

a second plurality of real term digital multipliers in one-to-one correspondence with said real and imaginary coefficients, each of said second real term multipliers being arranged to output a negated product of a corresponding imaginary coefficient multiplied by the most recent imaginary return sample;

real summing shift register means having a plurality of storage positions in one-to-one correspondence with said first and second pluralities of real term digital multipliers and a plurality of digital summers arranged such that a number stored in each real summing shift register means storage position is summed with the outputs of said first and second pluralities of real term digital multipliers associated with an adjacent real summing shift register means storage position before being shifted to said adjacent real storage position; and imaginary summing shift register means having a plurality of storage positions in one-to-one correspondence with said first and second pluralities of imaginary term digital multipliers and a plurality of digital summers arranged such that a number stored in each imaginary summing shift register means storage position is summed with the outputs of said first and second pluralities of imaginary term digital multipliers associated with an adjacent imaginary summing shift register means storage position before being shifted to said adjacent imaginary storage position.

4. A filter as claimed in claim 1, wherein said radar signal comprises a chirp of linearly varying frequency repeated at a desired pulse rate.

5. A filter as claimed in claim 1, wherein said radar signal comprises a chirp of hyperbolically varying frequency repeated at a desired pulse rate.

* * * * *